US008314886B2

(12) United States Patent
Keen

(10) Patent No.: US 8,314,886 B2
(45) Date of Patent: Nov. 20, 2012

(54) SYSTEM AND METHOD FOR PROVIDING ELECTROSTATIC DISCHARGE (ESD) PROTECTION AND ELECTROMAGNETIC INTERFERENCE (EMI) PROTECTION

(75) Inventor: Ronald Thomas Keen, Indianapolis, IN (US)

(73) Assignee: Shenzhen TCL New Technology Ltd, Shenzhen, Guangdong (CN)

( * ) Notice: Subject to any disclaimer, the term of this patent is extended or adjusted under 35 U.S.C. 154(b) by 616 days.

(21) Appl. No.: 12/519,514

(22) PCT Filed: Jan. 10, 2007

(86) PCT No.: PCT/US2007/000647

§ 371 (c)(1), (2), (4) Date: Jun. 16, 2009

(87) PCT Pub. No.: WO2008/085166

PCT Pub. Date: Jul. 17, 2008

(65) Prior Publication Data

US 2010/0091197 A1 Apr. 15, 2010

(51) Int. Cl.
*H04N 5/46* (2006.01)

(52) U.S. Cl. ........................................ 348/558; 348/556

(58) Field of Classification Search .................... 52/820; 348/554, 555, 556, 558, 474; 358/188
See application file for complete search history.

(56) References Cited

U.S. PATENT DOCUMENTS

| | | | |
|---|---|---|---|
| 5,331,351 | A | 7/1994 | Haas |
| 5,500,546 | A | 3/1996 | Marum et al. |
| 5,629,776 | A | 5/1997 | Lagoni |
| 5,966,283 | A | 10/1999 | Glaser et al. |
| 6,008,970 | A | 12/1999 | Maloney et al. |
| 6,288,885 | B1 | 9/2001 | Jiang et al. |
| 6,972,939 | B1 | 12/2005 | Ho et al. |
| 7,057,867 | B1 | 6/2006 | Vashchenko et al. |
| 7,394,638 | B2 | 7/2008 | Ahmad et al. |
| 2002/0130390 | A1 | 9/2002 | Ker et al. |

FOREIGN PATENT DOCUMENTS

| | | | |
|---|---|---|---|
| DE | 3626800 | A1 | 2/1988 |
| EP | 0681365 | A | 11/1995 |

OTHER PUBLICATIONS

PCT International Search Report and Written Opinion for PCT/US2007/000647, dated Sep. 6, 2007.

*Primary Examiner* — Mark Wendell
(74) *Attorney, Agent, or Firm* — Fletcher Yoder, P.C.

(57) ABSTRACT

An exemplary embodiment of the present invention relates to an electrostatic discharge/electromagnetic interference (ESD/EMI) protection circuit for an integrated circuit. The ESD/EMI protection circuit comprises an input that is adapted to receive a communication signal, a Zener diode pair connected between the input and a ground that is shared with the input, a resistor coupled to the input, and a capacitor coupled in series with the resistor between the input and the integrated circuit.

20 Claims, 3 Drawing Sheets

300

300

SYSTEM AND METHOD FOR PROVIDING ELECTROSTATIC DISCHARGE (ESD) PROTECTION AND ELECTROMAGNETIC INTERFERENCE (EMI) PROTECTION

FIELD OF THE INVENTION

The present invention relates generally to protecting electronic devices in electronic systems from electrostatic discharge (ESD) and electromagnetic interference (EMI).

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Many modern electronic devices, including television sets, have inputs that are sensitive to ESD and/or EMI. Known protection circuits that have been effective for ESD protection in analog systems are less effective for digital applications. This is in part because of the larger bandwidth required by digital television signals compared to analog signals. Additionally, known protection circuits do not effectively prevent the entry of EMI generated by an external device. Another disadvantage of known ESD protection circuits is that they require significant duplication of components to protect multiple devices connected to a given input. A system and method for protecting electronic devices from effects attributable to ESD and/or EMI in digital signal processing applications is desirable.

SUMMARY OF THE INVENTION

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

An exemplary embodiment of the present invention relates to an electrostatic discharge/electromagnetic interference (ESD/EMI) protection circuit for an integrated circuit. The ESD/EMI protection circuit comprises an input that is adapted to receive a communication signal, a Zener diode pair connected between the input and a ground that is shared with the input, a resistor coupled to the input, and a capacitor coupled in series with the resistor between the input and the integrated circuit.

BRIEF DESCRIPTION OF THE DRAWINGS

Advantages of the invention may become apparent upon reading the following detailed description and upon reference to the drawings in which.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
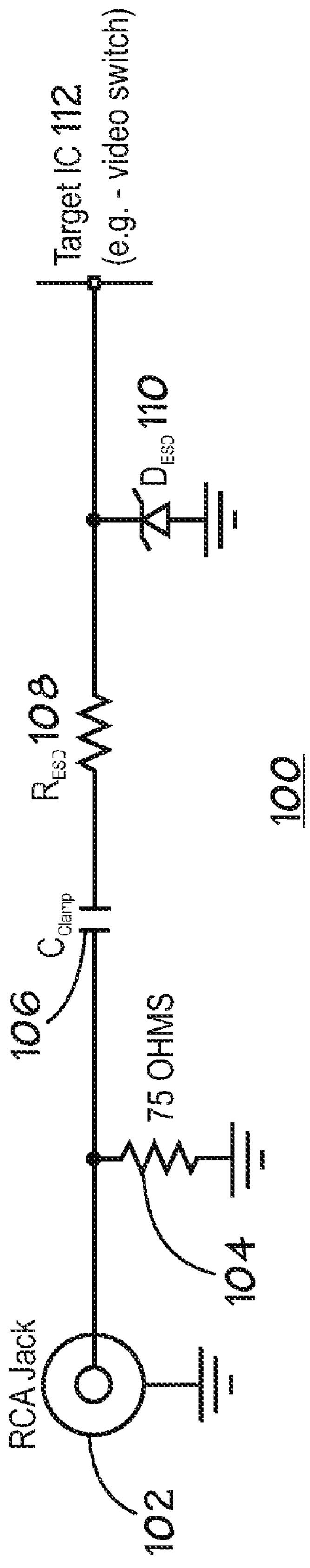
FIG. 1 (Prior Art)
FIG. 1 is a schematic diagram of a known ESD protection circuit useful in illustrating an example of a problem addressed by an exemplary embodiment of the present invention.

FIG. 1 is a schematic diagram of a known ESD protection circuit useful in illustrating an example of a problem addressed by an exemplary embodiment of the present invention. The ESD protection circuit is generally referred to by the reference number 100. The ESD protection circuit 100 comprises a video input 102, which may be adapted to receive an input signal such as a television signal. An input resistor 104 is connected across the video input 102 to system ground. A capacitor $C_{Clamp}$ 106 and a resistor $R_{ESD}$ 108 are connected in series between the video input 102 and a target integrated circuit (IC) device 112. The target IC 112, which may comprise a video switch, is the device being protected from ESD by the ESD protection circuit 100. A Zener diode $D_{ESD}$ 110 is connected to system ground from a junction between the resistor $R_{ESD}$ 108 and the target IC 112.

The value of the capacitor $C_{Clamp}$ 106 depends on the voltage level needed to protect the target IC 112 from damage. The value of the resistor $R_{ESD}$ 108 is chosen to limit current generated by ESD. The Zener diode $D_{ESD}$ 110 dissipates and limits the actual ESD event, and the Zener breakdown voltage is usually chosen to be higher than the pin voltage of the target IC 112, but close to a supply voltage of the target IC 112.

Although the ESD protection circuit 100 works relatively well for protecting inputs that receive analog video signals, it is not as effective for protecting inputs that are adapted to receive digital video signals such as high definition television signals. One problem is that the low pass roll-off of the ESD protection circuit 100 typically limits the bandwidth of the input with respect to its ability to receive digital video signals. For example, a typical value of the resistor $R_{ESD}$ 108 is about 68 ohms and a typical value of the capacitor $C_{Clamp}$ 106 is about 100 picofarads (pf) for a bandwidth of 23 Megahertz (MHz).

Another problem with the ESD protection circuit 100 is that it does not effectively prevent EMI from being coupled out of the video input 102. Digital noise from internal sources such as leaking clock circuits creates undesirable EMI that may interfere with external RF processes.

Yet another problem with the ESD protection circuit 100 is that it requires significant duplication of components if multiple devices such as the target IC 112 are in need of ESD protection or if multiple pins of the target IC 112 are connected to the video input 102. For example, each device or pin needing ESD protection could require additional capacitors, resistors and Zener diodes corresponding to the capacitor $C_{Clamp}$ 106, the resistor $R_{ESD}$ 108 and the Zener diode $D_{ESD}$ 110. In addition to the added expense associated with component replication, circuit board layout could be made more difficult as well.

Figure 2:
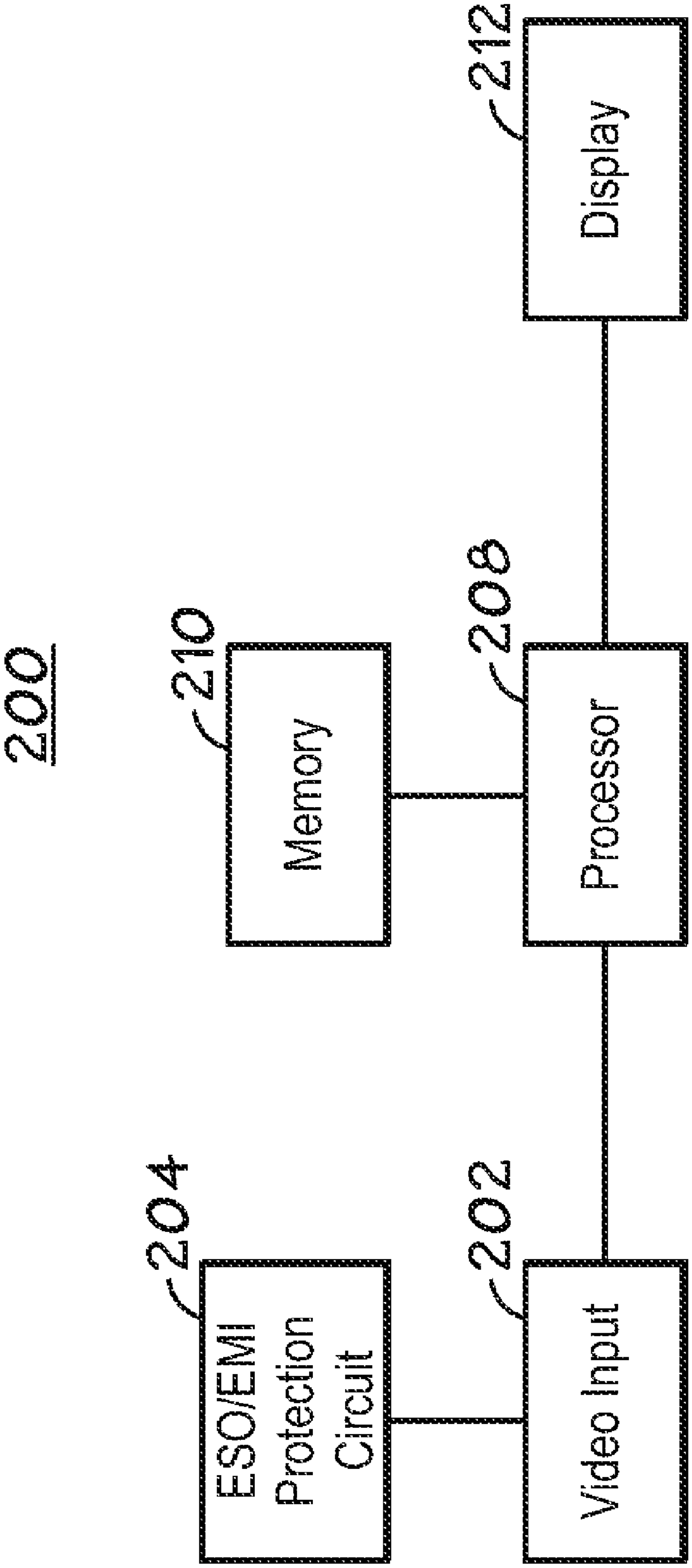
FIG. 2 is a block diagram of an electronic device in accordance with an exemplary embodiment of the present invention.

FIG. 2 is a block diagram of an electronic device in accordance with an exemplary embodiment of the present invention. The electronic device, which may comprise a television set, a projector, a set top box, a computer system or the like, is generally referred to by the reference number 200. The electronic device 200 comprises a video input 202, an ESD/EMI protection circuit 204, a processor 208, a memory 210, and a display 212. The memory 210 may be adapted to hold machine-readable computer code that allows the processor 208 to control the operation of the electronic device 200.

The video input 202 is adapted to receive a video signal such as a high definition (or other digital) television signal. The operation of the ESD/EMI protection circuit 204 is explained in detail below with respect to FIG. 3. The processor 208 is adapted to received the tuned signal and create a display signal corresponding to the tuned signal. The display 212 is adapted to receive the display signal and to display an image corresponding thereto.

Figure 3:
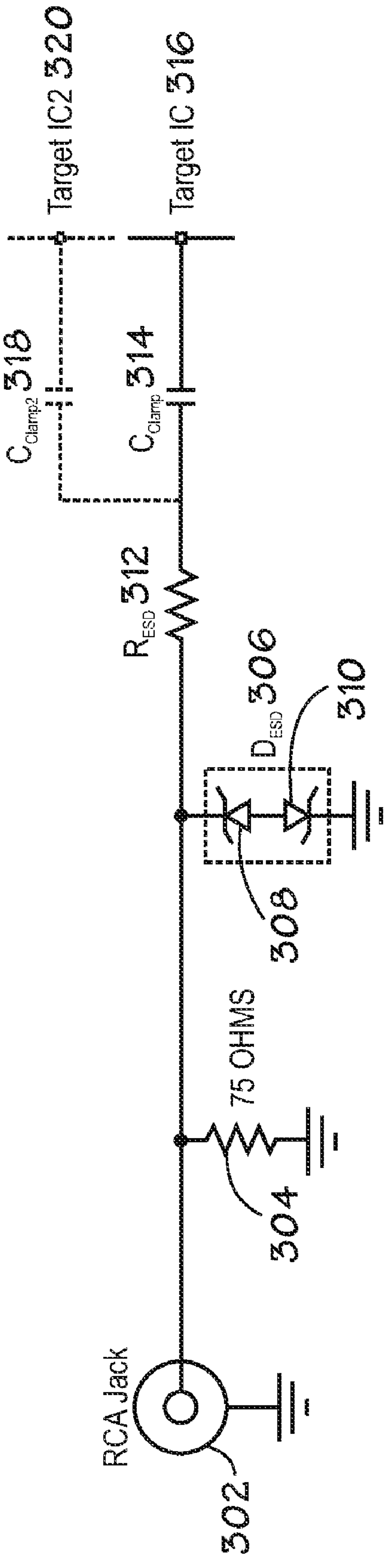
FIG. 3 is a schematic diagram of an ESD/EMI protection circuit in accordance with an exemplary embodiment of the present invention.

FIG. 3 is a schematic diagram of an ESD/EMI protection circuit in accordance with an exemplary embodiment of the present invention. The ESD/EMI protection circuit is generally referred to by the reference number 300. The ESD/EMI protection circuit 300 comprises a video input 302, which may be adapted to receive a wide bandwidth input signal such as a digital television signal. The specific construction of the video input 302 is not an essential feature of an exemplary embodiment of the present invention. An RCA jack or connector is one example of a suitable configuration for the video input 302. An input resistor 304 is connected across the video input 302 to system ground.

The ESD/EMI protection circuit 300 comprises a back-to-back Zener diode pair $D_{ESD}$ 306, referred to hereinbelow as the Zener diode pair $D_{ESD}$ 306. The Zener diode pair $D_{ESD}$ 306, which is connected between the video input 302 and system ground, is shown in dashed lines in FIG. 3. In an exemplary embodiment of the present invention, the Zener diode pair $D_{ESD}$ 306 comprises a first Zener diode 308 and a second Zener diode 310.

A resistor $R_{ESD}$ 312 and a capacitor $C_{Clamp}$ 314 are connected in series between the video input 302 and a target IC device 316. The target IC 316, which may comprise a video switch, is the device being protected from ESD and/or EMI by the ESD/EMI protection circuit 300.

In the exemplary embodiment of the present invention illustrated in FIG. 3, the resistor $R_{ESD}$ 312 and the Zener diode pair $D_{ESD}$ 306 perform the dual functions of ESD protection and EMI protection. With respect to ESD protection, the Zener diode pair $D_{ESD}$ 306 clamps an incoming ESD pulse to a known voltage, such as approximately six volts. In an exemplary embodiment of the present invention, the first Zener diode 308 and the second Zener diode 310 each have a value of about five volts in the reverse direction and about 0.7 volts in the forward direction. The resistor $R_{ESD}$ 312 limits the residual voltage to a low current that is unlikely to harm the target IC 316. In an exemplary embodiment of the present invention, the value of the resistor $R_{ESD}$ 312 is about 33 ohms, which is less than half the value of the resistor $R_{ESD}$ 108 in a typical known ESD protection circuit such as the circuit 100 shown in FIG. 1.

Those of ordinary skill in the art will appreciate that the effect of RC roll-off is reduced in an exemplary ESD/EMI protection circuit 300 with respect to the known circuit 100 shown in FIG. 1 because the value of the resistor $R_{ESD}$ 312 (FIG. 3) is significantly lower than the value of the resistor $R_{ESD}$ 108 (FIG. 1). Additionally, those of ordinary skill in the art will appreciate that the contribution of capacitance to RC roll-off is significantly reduced in the ESD/EMI protection circuit 300 relative to the known ESD protection circuit 100 shown in FIG. 1 because there is no capacitance corresponding to the diode $D_{ESD}$ 110 after the series $R_{ESD}$ 108 (FIG. 1) in the ESD/EMI protection circuit 300.

With respect to EMI protection, the ESD/EMI protection circuit 300 provides RC roll-off in the opposite direction (i.e., from the perspective of the target IC 316). This RC roll-off is provided by the resistor $R_{ESD}$ 312 and capacitance of the Zener diode pair $D_{ESD}$ 306, which may have a value of about 20 picofarads (pf).

A benefit of an exemplary embodiment of the ESD/EMI protection circuit 300 is that it allows protection of multiple pins on a target IC or even pins on multiple target ICs with only minimal additional circuitry. For example, a capacitor $C_{Clamp}$ 318 (shown in dashed lines in FIG. 3) is the only additional circuitry needed to provide ESD and EMI protection to a second target IC 320 (also shown in dashed lines).

Those of ordinary skill in the art will appreciate that an exemplary embodiment of the present invention provides numerous benefits. Among those benefits is reduced part count with respect to known ESD protection circuits, which contributes to reduced system cost. In addition, protection against EMI is added and circuit board layout is simplified with respect to known ESD protection circuits.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. An electrostatic discharge/electromagnetic interference (ESD/EMI) protection circuit for an integrated circuit, the ESD/EMI protection circuit comprising:
an input that is adapted to receive a communication signal at an input node;
a Zener diode pair connected between the input node and a ground that is shared with the input;
a resistor connected directly to and between the input node and a second node; and
a capacitor coupled in series with the resistor between the second node and the integrated circuit.

2. The ESD/EMI protection circuit recited in claim 1, comprising a second capacitor connected between the second node and a second integrated circuit.

3. The ESD/EMI protection circuit recited in claim 1, comprising a second capacitor connected in parallel with the capacitor to protect a second integrated circuit.

4. The ESD/EMI protection circuit recited in claim 1, comprising a second capacitor connected in parallel with the capacitor to protect a different portion of the integrated circuit relative to the capacitor.

5. The ESD/EMI protection circuit recited in claim 1, wherein the input comprises a video input.

6. The ESD/EMI protection circuit recited in claim 1, wherein the input comprises a wide bandwidth video input.

7. The ESD/EMI protection circuit recited in claim 1, wherein the input comprises an RCA connector.

8. A television, comprising:
a video input that is adapted to receive a television signal at a video input node;

a processor that is adapted to receive the television signal and create a display signal corresponding to the tuned signal;

a display that is adapted to receive the display signal and to display an image corresponding thereto; and an electrostatic discharge/electromagnetic interference (ESD/EMI) protection circuit for an integrated circuit, the ESD/EMI protection circuit comprising:

a Zener diode pair connected between the video input node and a ground that is shared with the video input;

a resistor connected directly to and between the video input node and a second node; and a capacitor coupled in series with the resistor between the second node and the integrated circuit.

9. The television recited in claim 8, comprising a second capacitor connected between the second node and a second integrated circuit.

10. The television recited in claim 8, comprising a second capacitor connected in parallel with the capacitor to protect a second integrated circuit.

11. The television recited in claim 8, comprising a second capacitor connected in parallel with the capacitor to protect a different portion of the integrated circuit relative to the capacitor.

12. The television recited in claim 8, wherein the video input comprises a wide bandwidth video input.

13. The television recited in claim 8, wherein the video input comprises an RCA connector.

14. An electronic device, comprising:

a input that is adapted to receive a communication signal at an input node;

a processor that is adapted to receive the communication signal from the input tuned signal and create an output signal corresponding to the communication signal;

a memory that is adapted to contain machine-readable computer code that allows the processor to control the operation of the electronic device; and an electrostatic discharge/electromagnetic interference (ESD/EMI) protection circuit for an integrated circuit, the ESD/EMI protection circuit comprising:

a Zener diode pair connected between the input node and a ground that is shared with the input;

a resistor connected directly to and between the input node and a second node; and a capacitor coupled in series with the resistor between the second node and the integrated circuit.

15. The electronic device recited in claim 14, comprising a second capacitor connected between the second node and a second integrated circuit.

16. The electronic device recited in claim 14, comprising a second capacitor connected in parallel with the capacitor to protect a second integrated circuit.

17. The electronic device recited in claim 14, comprising a second capacitor connected in parallel with the capacitor to protect a different portion of the integrated circuit relative to the capacitor.

18. The electronic device recited in claim 14, wherein the input comprises a video input.

19. The electronic device recited in claim 14, wherein the input comprises a wide bandwidth video input.

20. The electronic device recited in claim 14, wherein the input comprises an RCA connector.

* * * * *